United States Patent [19]

Cowdery et al.

[11] Patent Number: 4,540,083

[45] Date of Patent: Sep. 10, 1985

[54] UNLATCH ASSEMBLY FOR A CONVEYOR SYSTEM

[75] Inventors: James R. Cowdery, Pellham, N.H.; David B. Park, Wilmington; Rouzas R. Khoylian, Belmont, both of Mass.

[73] Assignee: Santrade Ltd., Luzerne, Switzerland

[21] Appl. No.: 125,354

[22] Filed: Feb. 28, 1980
(Under 37 CFR 1.47)

[51] Int. Cl.³ .............................................. B65G 47/57
[52] U.S. Cl. .................................. 198/465.1; 198/580
[58] Field of Search ............... 198/472, 473, 485, 487, 198/488, 580, 740, 746, 748

[56] References Cited

U.S. PATENT DOCUMENTS

| | | | |
|---|---|---|---|
| 2,897,772 | 8/1959 | Hunter | 198/472 X |
| 3,202,262 | 8/1965 | Jones, Jr. | 198/748 |
| 3,993,189 | 11/1976 | Khoylian et al. | 198/472 X |
| 4,154,334 | 5/1979 | Ivanov et al. | 198/748 X |
| 4,232,779 | 11/1980 | Khoylian et al. | 198/472 |

Primary Examiner—Jeffrey V. Nase
Attorney, Agent, or Firm—Burns, Doane, Swecker & Mathis

[57] ABSTRACT

The unlatch assembly employs a reciprocating carriage to engage and pull a product-carrying mat entering into the ascending elevator away from the main conveyor. The carriage is reciprocated in a path under the elevator and disengages when the mat is fully within the elevator. The carriage drive employs a single chain to avoid skewing of the carriage.

15 Claims, 7 Drawing Figures

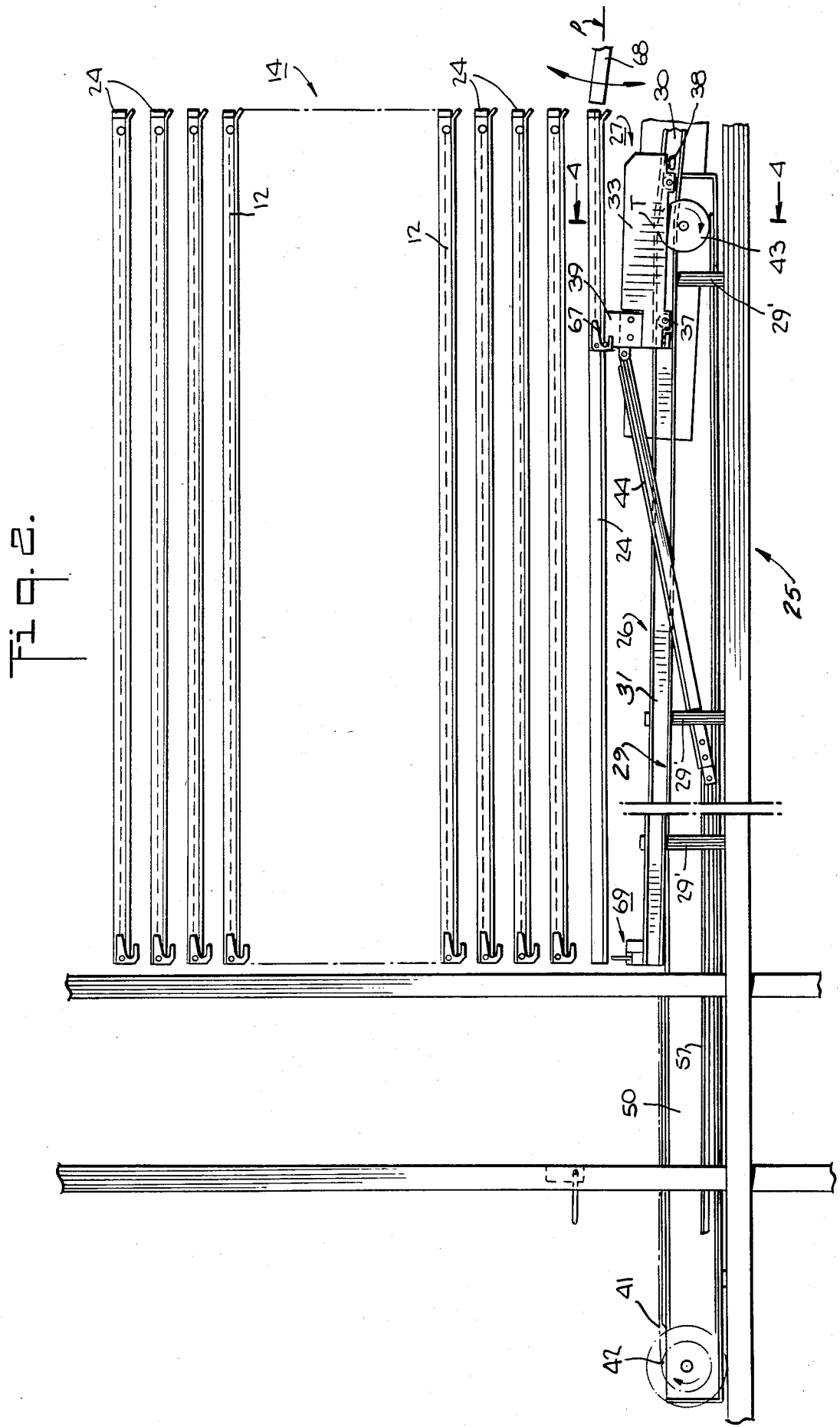

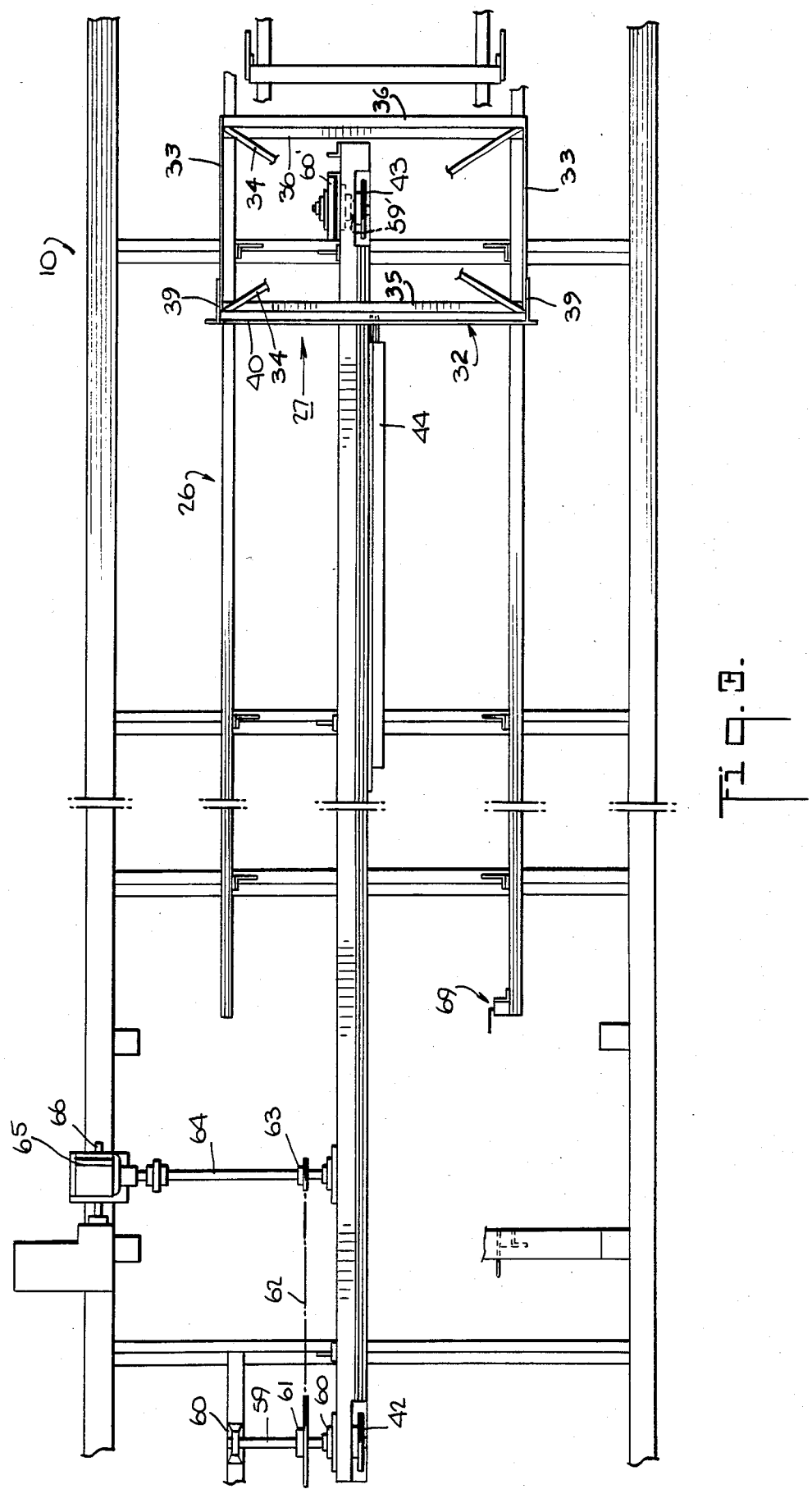

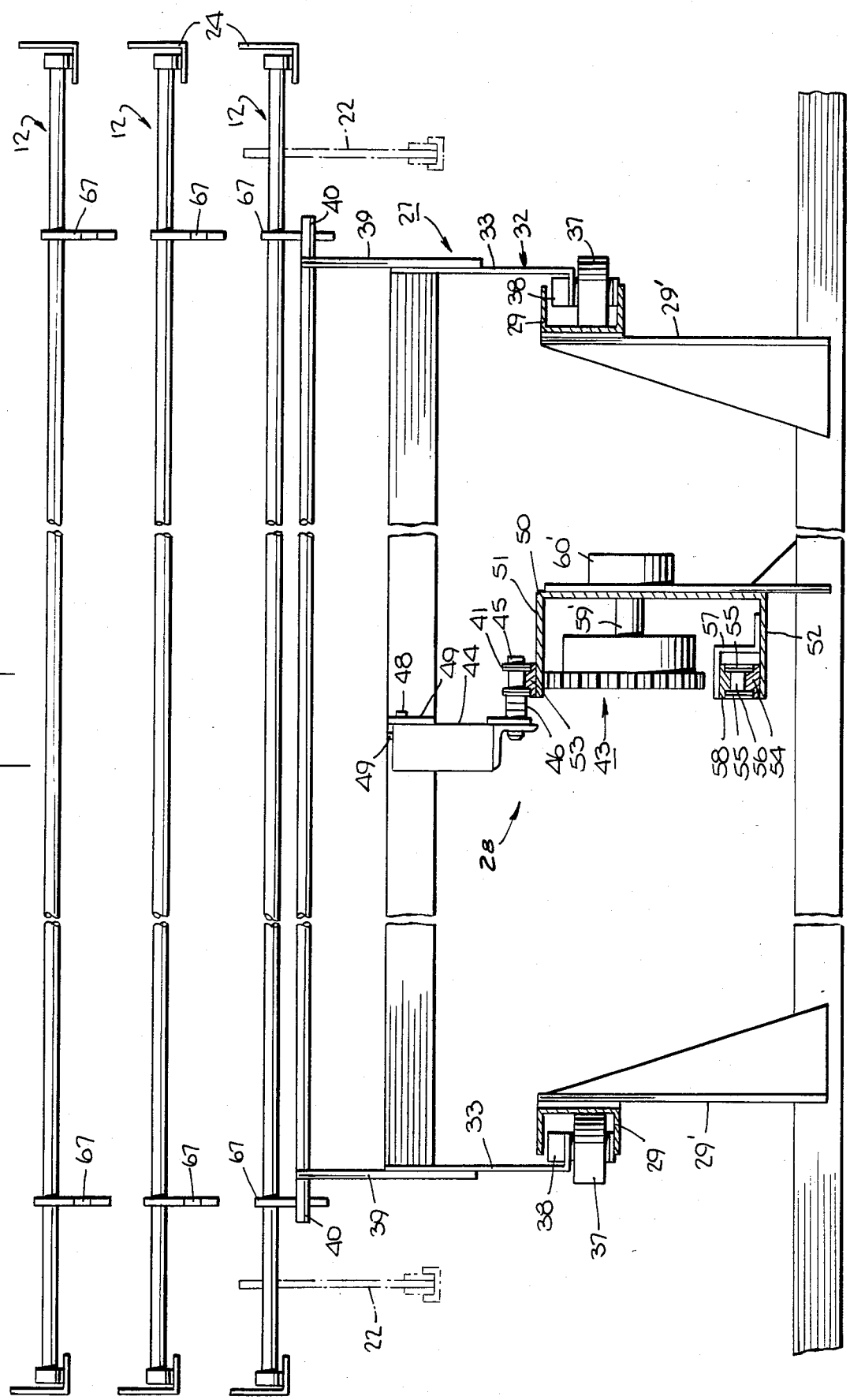

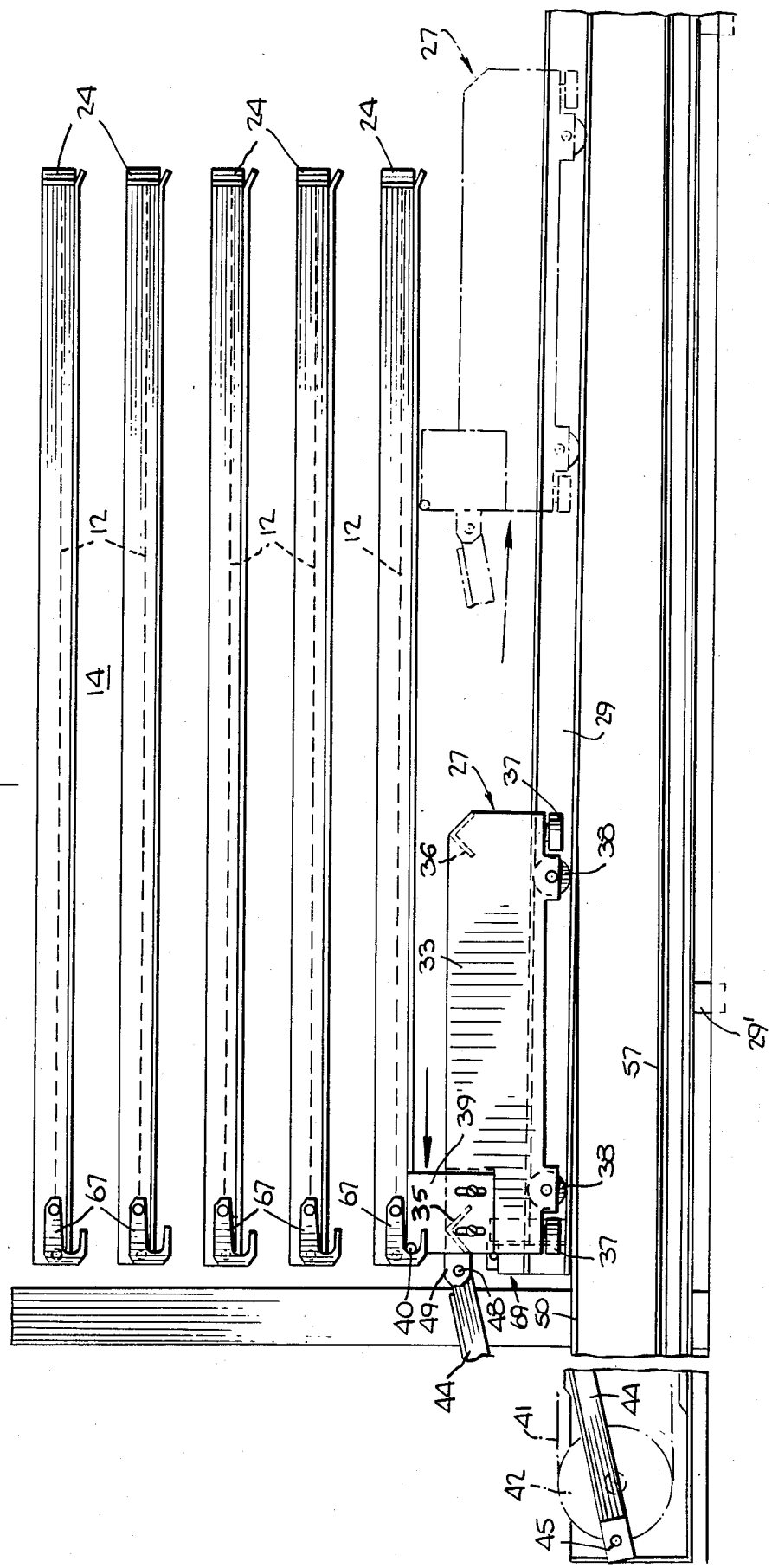

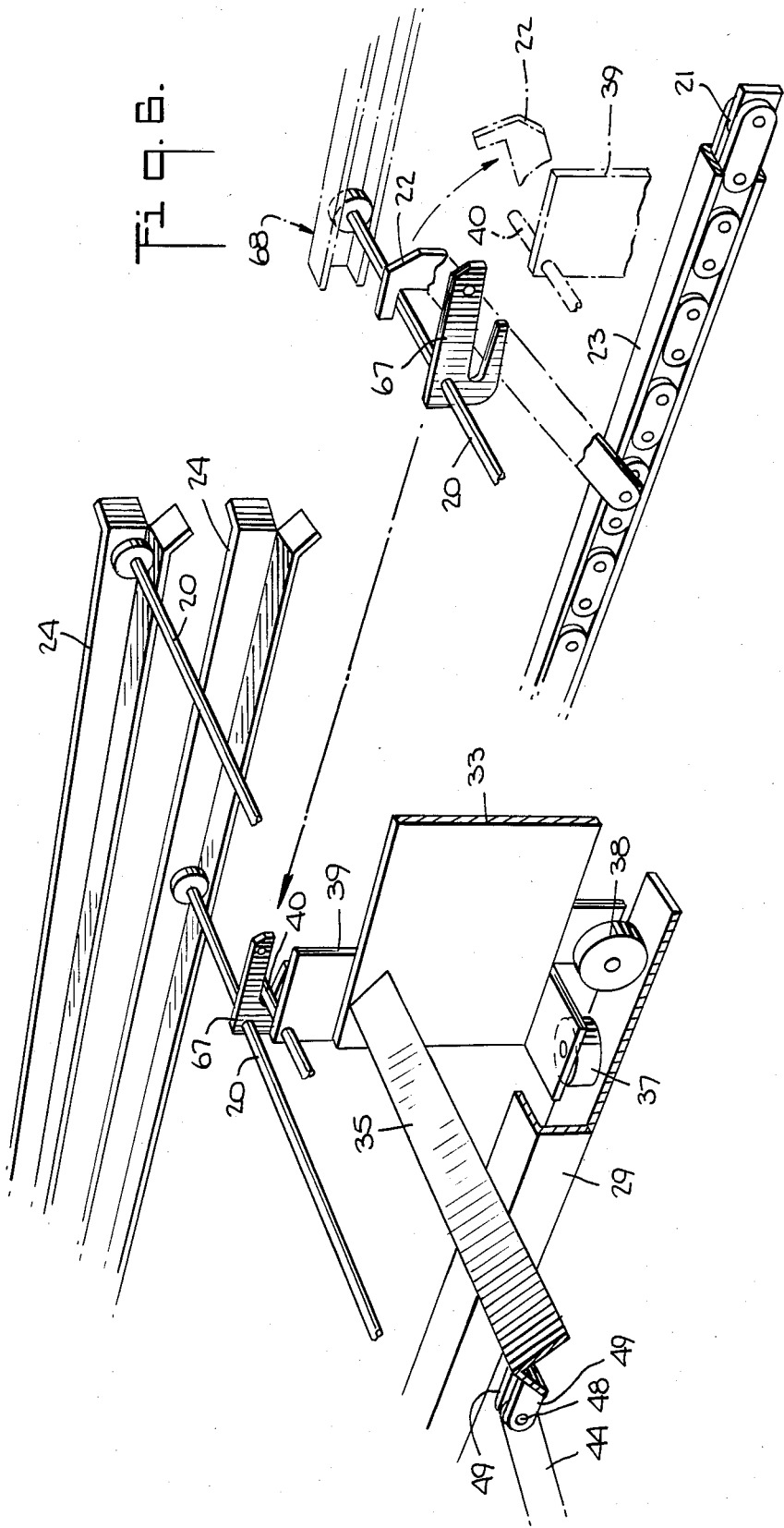

UNLATCH ASSEMBLY FOR A CONVEYOR SYSTEM

This invention relates to an unlatch assembly for a conveyor system.

As is known, various types of conveyor systems have been constructed to convey products along paths which are oriented in different manners from each other. Generally, in order to effect delivery of the conveyed products from one conveyor to another in these paths, various means have been employed. However, in a case where the conveyors are aligned in different planes, for example, one in a horizontal plane and one in a vertical plane, it has been difficult to maintain a smooth continuous conveyance of the products in a simple manner.

It has also been known for example, as described in U.S. Pat. No. 3,993,189, to convey products on flexible mats or carriers which are moved along a horizontal path by endless chains which are engaged by hooks on each mat and to transfer the mats or carriers onto a vertically disposed conveyor. As described, use is made of various cam-operated ramps to guide the conveyed mat from the horizontal conveyor to the vertically disposed conveyor. Also, the endless conveyor chains are inclined upwardly from a horizontal plane to guide the carriers along the inclining ramp while entering the vertically disposed conveyor. In addition, use has been made of an unlatch mechanism including drive pins which are disposed on a fast-moving endless chain to engage and pull the carrier out of engagement with the main conveyor chains; the actuation of the unlatch mechanism being caused by a depending hook on a carrier engaging a switch. The switch, in turn, activates the chain on which the drive pins are mounted.

Because of the inclination of the conveyor chains, the timing of the conveyor system becomes relatively complicated since the deviation from a horizontal path must be taken into account. Further, because the pins on the latch chain mechanism move at a faster speed than the conveyor chain, there is an initially abrupt impact of the pins with a carrier as well as an acceleration of the carrier. The abruptness of the initial engagement between the pin and carrier may, however, over a course of time, lead to loosening of the individual pins on the chain. This, in turn, may lead to a shut-down of the system in order to repair or replace one or more pins. Further, any undue loosening of a pin may lead to a failure of the unlatching mechanism to release a carrier from a hook on the conveyor chain. This, in turn, may lead to a jamming of the conveying system.

Accordingly, it is an object of the invention to provide for a smooth transition of a carrier from a horizontal conveyor onto a vertically disposed conveyor.

It is another object of the invention to provide a relatively simple unlatch assembly for sequentially unlatching and moving a series of product carrying carriers from a horizontal conveyor into a vertically disposed conveyor.

It is another object of the invention to provide an unlatch assembly for moving flexible carrier mats in a simple reliable manner without imparting undue stresses therein.

Briefly, the invention is directed to a conveyor system which has a plurality of carriers each of which has a rod at a forward end, a main conveyor for moving a sequential series of the carriers along a horizontal path via hooks on an endless chain, and a second conveyor having pairs of opposed tracks disposed in vertically stacked relation for sequentially receiving and conveying the carriers in a vertical plane. In accordance with the invention, an unlatch assembly is provided for sequentially unlatching and moving each carrier from the main conveyor onto a respective pair of tracks on the second conveyor.

The unlatch assembly includes an upwardly inclined trackway below the horizontal path of the carriers, a carriage which is movably mounted on the trackway and which has at least one bar thereon to engage a hook on each carrier in the horizontal path and means for reciprocating the carriage on the trackway with the bar moving from below the horizontal path into and through the path in order to engage a carrier while moving at a speed greater than the hook of the main conveyor in the horizontal path.

The trackway is constructed with a pair of inclined sections. One section has a steeper angle of inclination than the other and serves to permit the bar on the carriage to be disposed below the horizontal path of the carrier. The other section has an angle of inclination corresponding to the spacing between successive pairs of tracks in the vertical conveyor in order to allow the carriage to follow the movement of a carrier in a smooth manner.

The carriage is constructed with a frame and wheel means, such as rollers, for movably mounting the frame on the trackway so as to be reciprocated back and forth in a working stroke and return stroke.

The means for reciprocating the carriage includes a pair of rollers, an endless chain looped about the rollers below the plane of the horizontal path of the main conveyor chain and an arm articulated at one end to the chain for movement therewith and articulated to the carriage frame at the opposite end. The chain has an upper run and a parallel lower run whereby during movement of the arm along the lower run, the carriage moves along the trackway towards the second conveyor and during movement of the arm along the upper run, the carriage moves along the trackway away from the second conveyor.

A pivotally mounted ramp is also provided in the main conveyor to provide a transition surface on which each carrier may ride during passage from the main conveyor to the vertically moving tracks of the second conveyor. Suitable means are also provided to align this ramp with each pair of tracks of the second conveyor during movement of a carrier onto the tracks.

During operation, the main conveyor chain which has been previously engaged with the foremost rod of a carrier via a hook on the chain, conveys the carrier past a loading station to receive goods thereon. Thereafter, the loaded carrier moves along the horizontal path of the main conveyor and enters the pivotally mounted ramp. During this time, the carriage of the unlatch assembly is being moved under and away from the main conveyor chain in a return stroke and then brought upwardly along the trackway to a point under the carrier. At this time, the bar on the carriage engages a depending hook on the foremost rod of the carrier and the carriage then takes control over the motion of the carrier. The motion of the carriage along the trackway is such that the carrier is gradually pulled away from the hook of the main conveyor onto the tracks of the vertically disposed conveyor.

After the carrier has been pulled away from the hook of the main conveyor, this hook may pivot downwardly out of the plane of the carrier.

When the arm of the unlatch assembly reaches the end of the working stroke, the carrier is decelerated to a stop on the tracks of the vertical conveyor due to passage of the end of the arm about the roller thereat. The carriage is then accelerated away from the carrier at the beginning of the return stroke of the carriage.

These and other objects and advantages of the invention will become more apparent from the following detailed description and appended claims taken in conjunction with the accompanying drawings in which:

FIG. 3 illustrates a plan view of the unlatch assembly in FIG. 2;

FIG. 4 illustrates a view taken on line 4—4 of FIG. 2;

FIG. 5 illustrates an enlarged view of the unlatch assembly of FIG. 2;

FIG. 6 illustrates a fragmentary view of a forward end of the carriage of the unlatch assembly in accordance with the invention; and FIG. 7 illustrates a plan view of the carriage of the unlatch assembly.

Figure 1:
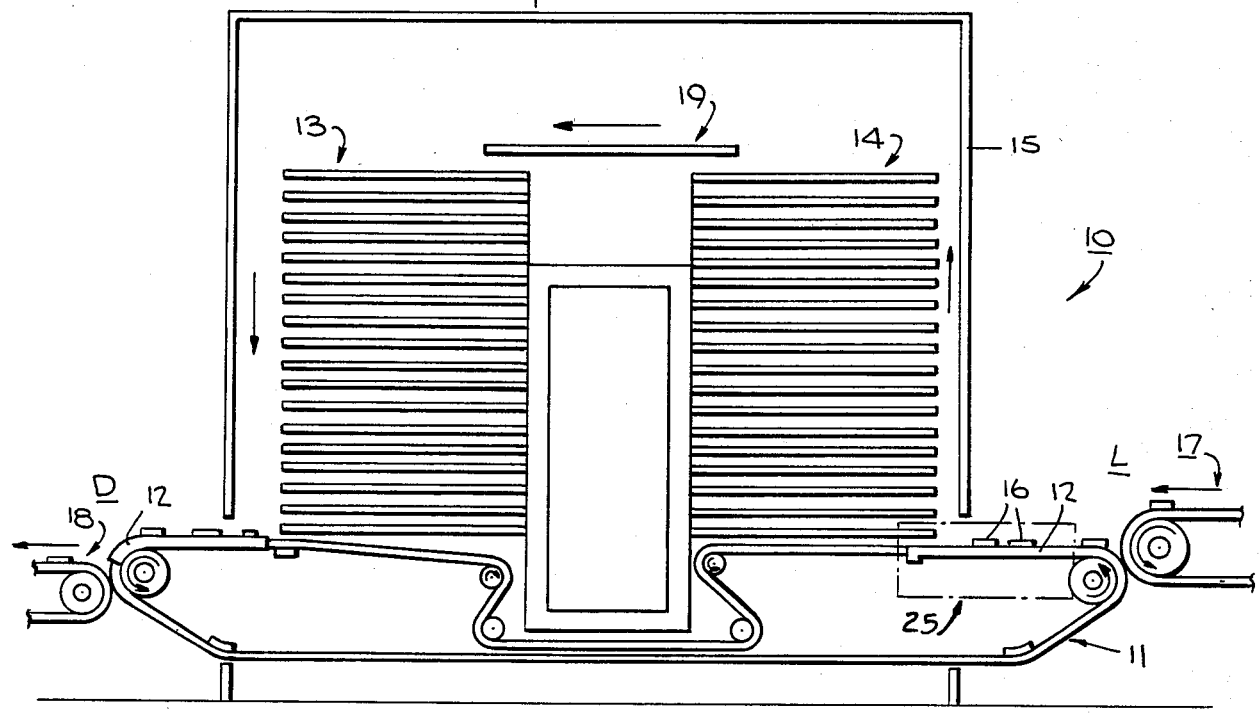
FIG. 1 illustrates a schematic view of a conveyor system employing an unlatch assembly in accordance with the invention.

Referring to FIG. 1, the conveyor system 10 is constructed in a manner similar to that as described in U.S. Pat. No. 3,993,189. In this regard, the conveyor system 10 includes a horizontally disposed main conveyor 11 for moving a sequential series of carriers 12 and a pair of vertically disposed conveyors 13, 14 in the form of elevators within a housing 15 for sequentially receiving and conveying the carriers 13 in a vertical plane. As shown, the main conveyor 11 has an infeed end at a loading station L for receiving products 16, such as food stuffs, from an infeed conveyor 17 and a discharge end for discharging the product after treatment at a delivery station D onto a discharge conveyor 18. The two elevators 13, 14 are disposed within the housing 15 to receive the carriers 12 from the main conveyor 11 for treatment, for example, for heating, drying, cooling, freezing, thawing, or the like of the products 16 on the carriers 12. A suitable transfer mechanism 19 is provided at the upper ends of the two elevators 13, 14 in order to transfer the carriers 12 therebetween.

Each of the carriers 12 is of a type similar to that described in U.S. Pat. No. 3,993,189 and is made with a plurality of rods 20 (see FIG. 6) which are interconnected by chain links (not shown).

The main conveyor 11 has one or more endless chains 21, each of which has a plurality of longitudinally spaced hooks 22 for respectively engaging the foremost rod 20 of each respective carrier 12. Each chain 21 is guided via a suitable guide 23 along a horizontal path extending from the loading station L and under the first elevator 14 within the housing 15. Each hook 22 is pivotally mounted on a chain 21 in suitable manner and is sized to engage the rod 20 of a respective carrier 12. For example, where two chains 21 are used, two hooks 22 engage the rod 20, one near each end as indicated in FIG. 6.

The first or ascending elevator 14 is constructed with pairs of opposed tracks 24 which are disposed in vertically stacked relation for sequentially receiving the carrier 12 and for conveying each carrier 12 in a vertical plane. The construction of the elevator 14 is otherwise known and need not be further described.

Figure 2:
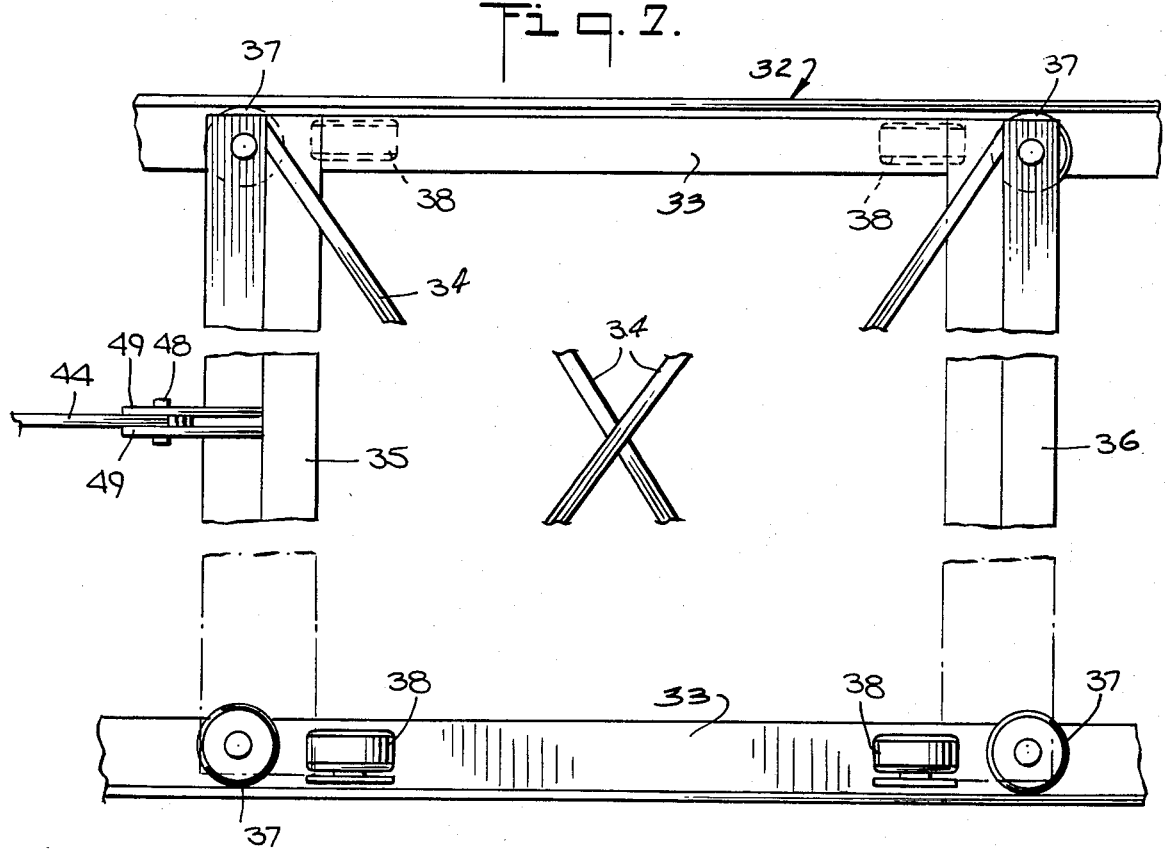
FIG. 2 illustrates a side view of an unlatch assembly in accordance with the invention.

Referring to FIGS. 1 and 2, an unlatch assembly 25 is positioned under the firt elevator 14 in order to sequentially unlatch and move each carrier 12 from the main conveyor 11 while on a respective pair of tracks 24 of the elevator 14. As shown, the unlatch assembly includes an upwardly inclined trackway 26 below the path P traversed by the carrier 12 on the tracks 24 via the main conveyor 11, a carriage 27 which is movably mounted on the trackway 26 to engage a carrier 12 in the path P and means 28 for reciprocating the carriage 27 on the trackway 26 to engage a carrier 12 therein while moving at a speed greater than the hook 22 of the main conveyor 11 in the path P.

Referring to FIGS. 2 and 4, the trackway 26 includes a pair of longitudinally disposed channel-shaped rails 29 which are disposed on supports 29' in outwardly facing relation within the confines of the main conveyor 11. These rails 29 are each located on an opposite side of the conveyor system and each has two inclined sections 30, 31. A first inclined section 30 extends from a point under the path of a conveyed carrier 12 on the elevator 14 and extends vertically upwardly to a transition point T. The following inclined section 31 extends from the transition point T to a point below the forward end (i.e. on the left as viewed in FIG. 2) of the ascending elevator 14 and has an angle of inclination corresponding to the spacing between successive pairs of tracks 23 on the elevator 14.

Referring to FIGS. 3 and 7, the carriage 27 includes a frame 32 having a pair of side plates 33 which are interconnected by cross bracing 34 to form a rigid structure. In additon, a pair of angle struts 35, 36 interconnect the side plates 33, one at the front and one at the back. Referring to FIG. 4, each side plate 33 carries wheel means on the lower end for rollably moving the frame 32 along the rails 29 of the trackway 26. As shown in FIG. 6, each wheel means includes a pair of rollers 37, 38 one of which rotates on a vertical axis while the other rotates on a horizontal axis within a rail 29. The respective sets of rollers 37, 38 serve to guide the carriage 27 along the trackway 26 while stabilizing the motion of the carriage 27.

Referring to FIG. 6 each side wall 33 also has an upstanding plate 39 affixed thereon, as by bolts, at a forward end. The plates 39 carry a horizontally disposed bar 40 which extends outwardly from the plates 39 for purposes as explained below.

Referring to FIGS. 2 and 4, the means 28 for reciprocating the carriage 27 includes an endless chain 41 which is disposed below the plane of the path of the main conveyor chain 21 and which is looped about a pair of rollers 42, 43. In addition, an arm 44 in the form of an angle is articulated at one end to the chain 41 for movement therewith while being articulated to the carriage frame 32 at the opposite end. As shown in FIG. 4, the arm 44 is articulated to the endless chain 41 via a shoulder bolt 45 which extends from the chain 41 through a bore in the arm 44. Suitable spacing washers 46 are disposed between a shoulder of the bolt 45 and the chain 41 to permit tightening of the bolt 45 while permitting the arm 44 to pivot relative to the bolt 45. The opposite end of the arm 44 is pivoted on a pin 48 which is carried by a pair of plates 49 fixed to a central zone of the forward strut 35 of the carriage frame 32.

As shown in FIG. 2, the chain 41 has two parallel runs whereby, during movement of the arm 44 along the lower run, the carriage 27 moves along the trackway 26 towards the elevator 14 while, during movement of the arm 44 along the upper run, the carriage 27 moves along the trackway 26 away from the elevator 14. In this regard, the motion of the endless chain 41 is such that the two rollers rotate in a clockwise direction as viewed in FIG. 2.

A channel shaped guide 50 extends along a substantial length of the endless chain 41 to guide both runs of the chain 41 thereon. As shown in FIG. 4, the guide 50 has a pair of horizontal legs 51, 52 each of which carries a T-shaped track 53, 54 on an upper side to guide the endless chain 41 therealong. The endless chain 41 is made of links 55 which are interconnected by pins (not shown) and which are spaced apart by rollers 56. Thus, the chain 41 is able to be guided along the stems of the T-shaped tracks 53,54. In addition, a guide 57 is mounted on the lower leg 52 along an intermediate length of the lower run of the chain 41 in order to restrain the chain 41 from lifting away from the track 54 during pulling of the carriage 27. This guide 57 is secured in place as by bolts and also carries a T-shaped track 58 in opposed facing relation to the track 54 on the lower leg 52 of the channel shaped guide 50.

Referring to FIG. 3, the forward roller 42 is mounted on a shaft 59 which is journalled in two bearings 60 and which carries a sprocket 61. The sprocket 61 is, in turn, driven by a chain 62 from a sprocket 63 on a drive shaft 64. The drive shaft 64 is, in turn, connected via a gear box 65 with a power shaft 66 so as to be driven in synchronism with the conveyor system 10. The rear roller 43 is mounted on a shaft 59' which is journalled in a bearing 60' for free rotation.

Referring to FIG. 6, each carrier 12 has a foremost rod 20 which carries a pair of hooks 67 thereon. Each hook 67 is supported in depending fashion and is aligned to move within the same vertical plane as a projecting end of the horizontally-extending bar 40 on the carriage 27.

Referring to FIG. 2, the conveyor system also includes a pivotally mounted ramp 68 in the horizontal path of the main conveyor chain 21 for sequentially receiving and guiding each carrier 12 thereon. In addition, means (not shown) are provided for aligning the ramp 68 with a respective pair of tracks 24 on the elevator 14 to permit the ramp 68 to pivot upwardly while the tracks 24 of the elevator 14 move upwardly.

In operation, the main conveyor 11 which is formed with two chains 21 sequentially conveys a series of the flexible carriers or mats 12 along a lower run to the loading station L. At this station L, the products 16 are deposited onto each carrier 12 in turn. Each carrier 12 is then pulled along a horizontal path via the hook 22 of each chain 21 onto the ramp 68, and thence, onto the empty lowermost pair of tracks 24 in the ascending elevator 14. As the elevator 14 is rising, the ramp 68 thus pivots upwardly with the aligned pair of tracks 24.

While the carrier 12 moves along the ramp 68, the foremost rod 20 of the carrier 12 is elevating. Thus, the hooks 22 of the main conveyor chains 21 also pivot upwardly to follow the foremost rod 20 of the carrier 12.

As the hooks 22 of the conveyor chains 21 pull the carrier along the path P on the tracks 24, the carriage chain 41 is pulling the carriage 27 in a working stroke upwardly along the initial trackway section 30. At this time, the carriage 27 is located below the plane of the carrier 12. Subsequently, the carriage 27 arrives at the transition point T between the two trackway sections 30, 31 and at this point, the horizontally extending bar 40 on the carriage 27 engages the depending hooks 67 on the foremost rod 20 of the carrier 12. At this point, the foremost rod 20 is engaged by the bar 40 as well as by the two hooks 22 of the main conveyor chain 21. However, as the carriage 27 moves at a faster speed than the main conveyor chains 21, for example, at twice the speed, the carrier 12 is pulled away from the hooks 22 of the chains 21. The hooks 22 then pivot downwardly away from the carrier 12 and drop below the plane of the carrier 12. The carrier 12 is then moved at a faster speed by the carriage 27 along the aligned tracks 24 of the elevator 14. During this time, the articulated arm 44 moves along the lower run of the endless chain 41. As the arm 44 reaches the foremost roller 42, as viewed, in FIG. 2, the carrier 12 approaches the front end of the elevator tracks 24. As the arm 44 moves about the roller 42 and passes into the upper run of the endless chain 41, the carriage 27 begins to move away from the hooks 67 on the foremost rod 20 of the carrier 12. In this regard, the roller 42 is positioned in correspondence to a forward end of the tracks 24 of the eldvator 14 to permit disengagement of the bar 40 from the carrier 12 at the beginning of the return stroke of the carriage 27.

While the articulated arm 44 moves along the upper run of the endless chain 41, the carriage 27 is returned in a return stroke to the original position on the foremost inclined section 30 of the trackway 26 below the plane of the next carrier and within the plane of the elevator 14 and recycled.

Since the second inclined section 31 of the trackway 26 has an angle of inclination corresponding to the spacing between successive pairs of tracks 24 on the elevator 14, the bar 40 on the carriage 27 and the hooks 67 of the carrier 12 remain in a static relationship with respect to each other during travel.

Due to the reciprocating action of the carrier 27 along the trackway 26, there is a smooth disengagement of the carriage 27 from a carrier 12 in the elevator 14. Further, since the carriage 27 moves in accordance with the movement of the articulated arm 44 about the roller 42, the motion of the carriage 27 follows a harmonic such that each carrier 12 is decelerated immediately prior to stopping on the elevator 14 and the bar of the carriage 27, after stopping of each carrier 12, is accelerated away from the carrier 12.

Referring to FIG. 2, a safety switch 69 is located at the end of the trackway 26 for the carriage 27 below an end of the lowermost pairs of tracks 24 of the elevator 14. This safety switch 69 serves to detect passage of a carrier 12 thereby should a carrier not be moved onto the tracks 24 of the elevator 14 correctly but rather stays engaged with the main conveyor chains 21. Upon actuation of the switch 69 by a misconveyed carrier, suitable means connected to the safety switch 69 are actuated to deactivate the conveyor system 10.

The invention thus provides an unlatch mechanism which is reciprocated once for each carrier or mat which is to be fed into the elevator from a main conveyor chain.

Because a bar is used by the unlatch mechanism rather than pins on a chain, the stressing of the bar can be more readily absorbed through the carriage. Accordingly, breakage of the bar can be reduced to a minimum. Further, because the bar is mounted directly on the carriage, the size of the bar can be made of any suitable size to withstand stressing while at the same time being of sufficient size to engage with the hooks on the various carriers or mats which are used within the conveyor system.

Further, since the carriage rides on a trackway which is geometrically related to the path of motion of a carrier or mat, the carrier need not be engaged at a predetermined point but may be engaged within a range. Thus, synchronization of the movement of the carrier and the carriage need not be fine. Also, because the main conveyor chain is disposed in a horizontal path in the area in which the unlatch mechanism operates, the timing of the conveyor system may be simplified.

Where a carrier having a pair of depending hooks is engaged by a single bar of a reciprocating carriage, skewing of the forward end of the carrier can be avoided.

The invention provides a single unlatch carriage drive chain with stabilizing rollers which is more dependable and which minimizes skewing relative to assemblies using two chains wherein, if one chain "jumped" because of ice or other impediment, skewing was forced.

Further, the unlatch assembly operates without clutches or other engaging-disengaging devices which have been undependable in hostile environments.

What is claimed is:

1. In combination with a conveyor system having a plurality of carriers, each said carrier having a rod at a forward end thereof and at least one depending hook on said rod; a main conveyor for moving a sequential series of said carriers along a horizontal path, said conveyor having a plurality of longitudinally spaced hooks for respectively engaging said rod of each respective carrier and an endless chain for moving said hooks of said conveyor along said horizontal path; and a second conveyor having pairs of opposed tracks disposed in vertically stacked relation for sequentially receiving and conveying said carriers in a vertical plane; an unlatch assembly for sequentially unlatching and moving each carrier from said main conveyor onto a respective pair of tracks of said second conveyor, said unlatch assembly comprising an upwardly inclined trackway below said horizontal path, a carriage movably mounted on said trackway and having a horizontally disposed bar thereon to engage said hook in said rod of said carrier in said horizontal path, and means for reciprocating said carriage on said trackway with said bar moving from below said horizontal path into and through said path to engage a carrier therein while moving at a speed greater than said hook of said main conveyor in said path.

2. The combination as set forth in claim 1 wherein said carriage includes a frame, and wheel means mounted on said frame for rollably moving said frame along said trackway.

3. The combination as set forth in claim 2 wherein said trackway includes a pair of longitudinally disposed channelshaped rails disposed in outwardly facing relation and said wheel means on said frame includes pairs of rollers disposed within each said rail to rotate about vertical axes along said rails and pairs of rollers disposed within each said rail to rotate about horizontal axes along said rails.

4. The combination as set forth in claim 2 wherein said means for reciprocating said carriage includes an endless chain disposed below the plane of said horizontal path and an arm articulated at one end to said chain for movement therewith and articulated to said carriage frame at an opposite end for decelerating the motion of an engaged carrier immediately prior to stopping on said second conveyor.

5. The combination as set forth in claim 4 wherein said chain has an upper run and a parallel lower run whereby during movement of said arm along said lower run said carriage moves along said trackway towards said second conveyor and during movement of said arm along said upper run said carriage moves along said trackway away from said second conveyor.

6. The combination as set forth in claim 5 wherein said means for reciprocating said carriage includes a guide along said lower run for restraining said chain from lifting.

7. The combination as set forth in claim 5 wherein said trackway has a first inclined section and a following second inclined section, said first inclined section having a steeper angle of inclination than said second section to permit said bar on said carriage to be disposed below said horizontal path, said second section having an angle of inclination sufficient to allow said carriage to follow the movement of a carrier on said tracks of said second conveyor in a smooth manner.

8. The combination as set forth in claim 1 wherein said trackway has a first inclined section and a following second inclined section, said first inclined section having a steeper angle of inclination than said second section to permit said bar on said carriage to be disposed below said horizontal path, said second section having an angle of inclination sufficient to allow said carriage to follow the movement of a carrier on said tracks of said second conveyor in a smooth manner.

9. The combination as set forth in claim 1 wherein said main conveyor includes a pivotally mounted ramp in said horizontal path for sequentially receiving and guiding each carrier onto a respective pair of said tracks while said respective pair of tracks moves upwardly in said vertical plane during movement of a carrier thereon.

10. The combination as set forth in claim 9 wherein each said hook of said main conveyor is pivotally mounted to follow the movement of an engaged carrier on said ramp.

11. The combination as set forth in claim 1 which further comprises a safety switch at an end of said trackway and below an end of said respective pairs of tracks for detecting passage of a carrier thereby in the plane of said horizontal path for deactivation of said system in response to activation of said switch.

12. The combination as set forth in claim 1 wherein said carriage has a pair of upstanding plates with said bar affixed thereon for engaging a pair of hooks on said rod of each respective carrier.

13. The combination as set forth in claim 1 wherein said means for reciprocating said carriage includes a pair of rollers, an endless chain looped about said rollers and disposed below the plane of said horizontal path, and an arm articulated at one end to said chain for movement therewith and articulated to said carriage frame at an opposite end.

14. The combination as set forth in claim 13 wherein one of said rollers is positioned in correspondence to a forward end of said tracks of said second conveyor to permit disengagement of said bar from a carrier prior to a return of said carriage.

15. A combination as set forth in claim 14 wherein said chain has an upper run and a parallel lower run whereby during movement of said arm along said lower run said carriage moves along said trackway towards said second conveyor and during movement of said arm along said upper run said carriage moves along said tracking away from said second conveyor.

* * * * *